(12) United States Patent
Zinner

(10) Patent No.: US 10,686,732 B2
(45) Date of Patent: Jun. 16, 2020

(54) METHOD AND CONTROL DEVICE FOR TRANSMITTING SAFETY-RELEVANT DATA IN A MOTOR VEHICLE BY MEANS OF AN ETHERNET STANDARD

(71) Applicant: Continental Automotive GmbH, Hannover (DE)

(72) Inventor: Helge Zinner, Magdeburg (DE)

(73) Assignee: Continental Automotive GmbH, Hannover (DE)

( * ) Notice: Subject to any disclaimer, the term of this patent is extended or adjusted under 35 U.S.C. 154(b) by 45 days.

(21) Appl. No.: 15/532,754

(22) PCT Filed: Dec. 3, 2015

(86) PCT No.: PCT/EP2015/078515
§ 371 (c)(1),
(2) Date: Jun. 2, 2017

(87) PCT Pub. No.: WO2016/087584
PCT Pub. Date: Jun. 9, 2016

(65) Prior Publication Data
US 2017/0331767 A1 Nov. 16, 2017

(30) Foreign Application Priority Data
Dec. 4, 2014 (DE) .................. 10 2014 224 944

(51) Int. Cl.
*H04L 12/939* (2013.01)
*H04L 1/08* (2006.01)
(Continued)

(52) U.S. Cl.
CPC .............. *H04L 49/552* (2013.01); *H04L 1/08* (2013.01)

(58) Field of Classification Search
None
See application file for complete search history.

(56) References Cited

U.S. PATENT DOCUMENTS

2004/0215812 A1  10/2004  Lu
2005/0226239 A1  10/2005  Nishida et al.
(Continued)

FOREIGN PATENT DOCUMENTS

CN  101641910 A  2/2010
CN  102598590 A  7/2012
(Continued)

OTHER PUBLICATIONS

International Search Report and Written Opinion dated Feb. 17, 2016 from corresponding International Patent Application No. PCT/EP2015/078515.
(Continued)

*Primary Examiner* — Kodzovi Acolatse
*Assistant Examiner* — Jay L Vogel

(57) ABSTRACT

Safety-relevant data in a motor vehicle is transmitted by means of an Ethernet standard via at least one intermediate node in an Ethernet packet. Each intermediate node receives an Ethernet packet, evaluates it, and forwards it accordingly. Provision is made for a data type for safety-relevant data to be transmitted in communication information in the Ethernet frame with the safety-relevant data, for each intermediate node to check the communication information from the data contents of the Ethernet frame in the received Ethernet packet for the presence of the data type for safety-relevant data, for each intermediate node to duplicate an Ethernet frame, which contains the data type for safety-relevant data in the communication information, at least once, and for each intermediate node to emit the duplicated Ethernet frame in a new Ethernet packet.

10 Claims, 3 Drawing Sheets

(51) Int. Cl.
*H04L 29/08* (2006.01)
*H04L 12/823* (2013.01)

(56) References Cited

U.S. PATENT DOCUMENTS

| | | | |
|---|---|---|---|
| 2007/0280217 A1 | 12/2007 | Flanagan et al. | |
| 2011/0310733 A1* | 12/2011 | Tzamaloukas | G01C 21/3691 370/230 |
| 2012/0173905 A1* | 7/2012 | Diab | H04L 12/66 713/320 |
| 2014/0226589 A1* | 8/2014 | Yousefi | H04N 7/183 370/329 |
| 2014/0245114 A1* | 8/2014 | Thaler | H04L 45/30 714/807 |
| 2014/0310354 A1* | 10/2014 | Fountain | H04L 12/4641 709/204 |
| 2015/0163174 A1* | 6/2015 | Koch | H04L 1/02 370/242 |
| 2015/0195293 A1* | 7/2015 | Kamble | H04L 69/16 726/22 |

FOREIGN PATENT DOCUMENTS

| | | |
|---|---|---|
| CN | 102801597 A | 11/2012 |
| CN | 103354991 A | 10/2013 |
| DE | 112012004782 T5 | 8/2014 |
| EP | 1657888 A1 | 5/2006 |

OTHER PUBLICATIONS

Industrial Communication Netowrks—High Availability Automation Networks—Part 3: Parallel Redundancy Protocol (PRP) and High-availability Seamless Redundancy (HSR). International Electrotechnical Commission. Dec. 31, 2010. Pages International Standard. Publication date: Mar. 31, 2016. pp. 1-62.

Service Name and Transport Protocol Port Number Registry, http://www.iana.org/assignments/service-names-port-numbers/service-names-port-numbers.xhtml [abgerufen am Oct. 26, 2015].

* cited by examiner

METHOD AND CONTROL DEVICE FOR TRANSMITTING SAFETY-RELEVANT DATA IN A MOTOR VEHICLE BY MEANS OF AN ETHERNET STANDARD

BACKGROUND

The invention relates to a method for transmitting safety-relevant data in a motor vehicle by means of an Ethernet standard, particularly the Ethernet IEEE 802.3 standard which, possibly in conjunction with the IEEE 802.1 Q standard, is also designated as IEEE 802.3 MAC tagged. The transmission of the safety-relevant data in the motor vehicle takes place from a transmitter via at least one intermediate node, also called "Switch" or "Bridge", to a receiver. Generally, transmitter, receiver and intermediate node are control devices which handle the function of the data transmission and possibly additional functions.

In the method for transmission it is provided that the safety-relevant data are sent from the transmitter in an Ethernet packet, the Ethernet packet having an Ethernet frame with the data content. The data content contains communication information and data.

Essential communication information is the destination address, the transmitter address and the Ethernet type which describes the payload of the Ethernet frame (i.e. its subprotocol). The other data include the content of the safety-relevant data to be transmitted and possibly control fields such as a checksum.

As part of the transmission, the or each intermediate node receives an Ethernet packet and evaluates at least a part of the communication information from the data content. In particular, the destination address, the transmitter address and the Ethernet type are read and taken into consideration in the further processing of the data packet. The further processing provides, in particular, for the forwarding of the Ethernet packets in accordance with the evaluated communication information.

The transmission of the safety-relevant data is concluded when the receiver receives the Ethernet packet and evaluates the communication information from the data content. If, on the basis of this evaluated communication information, it is actually the receiver of the safety-relevant data, the data from the data content are also evaluated because the transmission of the safety-relevant data is thus ended. In the intermediate node, i.e. during the transmission of the safety-relevant data, this content evaluation does not take place. It is only a faulty frame (CRC error) which would already be discarded here.

This above method corresponds to Ethernet standard IEEE 802.3, as defined and generally available at http://standards.ieee.org.

The background of the present invention is that the Ethernet is increasingly used also in the motor car as new networking technology. Instead of the Ethernet, proprietary real-time-capable busses are currently used in motor cars for the data communication which, due to the desired safety, necessitate a comparatively complex architecture of the communication network. For this purpose, the FlexRay bus used as real-time-capable communication bus offers a redundant channel for increasing the fault tolerance.

So that Ethernet can replace the real-time-capable communication busses currently used in the motor car and leads to an architecture which, overall, is less complex due to scale effects, Ethernet also has to support functions for achieving redundancy. This is of higher-level significance particularly with regard to future assistance functions because the planned assistance functions are intended to partially take over control of the vehicle completely. This requires a high degree of safety and corresponding redundancies in the communication channel. In this context, both the hardware (for example dual sensors, dual cabling) and the software (distributed virtual systems) can be designed redundantly.

Ethernet already offers functions today such as the STP (Spanning Tree Protocol) and the RSTP (Rapid Spanning Tree Protocol) in order to find new communication paths in the network if a communication path is disturbed, for example due to a cable or link which no longer operates. Naturally, this is only possible if in the network another communication path is available physically. The STP or RSTP protocols allow in such a case a rapid switch-over during operation. Furthermore, a trunking function is described as part of the Ethernet applications for grouping lines.

However, since Ethernet had been developed originally for other purposes, it does not itself offer the fault tolerance achieved by the proprietary communication busses in current motor cars.

If it is planned to use Ethernet as backbone network in the car, solutions are necessary so that Ethernet, too, can offer to the current systems comparable functions for redundancy. Otherwise, the proprietary field busses still have to be used which have a reduced range of functions and lead to increased complexity and more costs.

The data rate of these proprietary field busses, which are used today for safety-critical systems in the motor car, will also be no longer adequate in the foreseeable future since it has already reached its capacity limit for the systems already present today in the motor vehicle.

Errors in the transmission can occur in the Ethernet mainly due to the fact that, due to lacking electromagnetic compatibility (EMC), overload or other influences, individual data packets (Ethernet packets) are lost or corrupted at any time. This is shown diagrammatically in FIG. 1 which shows the transmission of an Ethernet packet 51 in a transmission system 50 according to the Ethernet standard. The transmission takes place between a first control device 52 used as transmitter and a second control device 53 used as receiver. On the transmission path 54, the Ethernet packet is damaged by a disturbance 55. Due to this damage, the damaged Ethernet packet 56 can no longer be read or utilized in the receiver 53 and has to be discarded.

Although the Ethernet standard offers the possibility of recognizing such damage with very high probability, a restoration of the original data is not provided for, however. Although, it is possible in principle that the receiver 53, in the case of receiving a damaged Ethernet packet 56, again requests the lost or defective Ethernet packet 56 at the transmitter 52. This can be achieved, for example, via the TCP protocol, the processing of which, however, only takes place in subsequent processing layers of the receiver and is not possible immediately in connection with the data transmission. In addition, communication back from the receiver 53 to the transmitter 52 is necessary before the data packet is sent out again. In the case of safety-critical applications, for example a braking process, such a communication process for establishing a redundancy can take too long even if protocols like TCP or IP can detect lacking data packets by means of sequence numbers and request them again.

In addition, it is only the receiver which can detect the lack of a data packet and request it again at the transmitter. This cannot be done by possible intermediate nodes used for forwarding the Ethernet packets because they do not operate at this layer.

Against this background, the object of the present invention lies in designing a communication according to the Ethernet standard to be more failure proof and to provide a redundant communication.

BRIEF SUMMARY

This object is achieved by a method having the features of claim 1 and a control device having the features of claim 8. Furthermore, the object set according to the invention is achieved by a computer program product having program code means which are suitable for configuring, when executed on a computing unit of a control device, the computing unit for carrying out the corresponding method steps in the communication sequence with other control devices. Depending on the operation of the control device, all of the functions described hereinafter or a selective selection thereof can be configured by the computer program product in the computer units of the control devices.

According to the invention, it is proposed that in the communication information of the Ethernet frame a data type for safety-relevant data is transmitted with the safety-relevant data. Such a data type can be redefined in the Ethernet standard, in principle. According to the invention, it is particularly preferably possible, however, to use as such a data type an identifier not defined in the standard. Each intermediate node which is provided for forwarding the Ethernet packet to the receiver checks in the received Ethernet packet the communication information from the data content of the Ethernet frame for the presence of this data type for safety-relevant data. If this data type for safety-relevant data is contained in the communication information of the Ethernet frame, each intermediate node duplicates this Ethernet frame at least once preferably identically and sends out the duplicated Ethernet frame, or each one of the duplicated Ethernet frames, respectively, in a new Ethernet packet. This means, in other words, that additionally to the received and forwarded Ethernet packet with the original Ethernet frame, at least one new Ethernet packet with the preferably identically duplicated Ethernet frame is transmitted. Should one of the two Ethernet packets with the Ethernet frames of identical content be lost or damaged on the transmission path, the receiver can obtain the information from the respective other (or, in the case of more than one duplication, from one of the other) Ethernet packets. Combined transmitting of a data type is to be understood in such a way that, in a data field used for this purpose in the area of the communication information of the Ethernet frame, an identifier of the data type is transmitted. By this means, the redundancy needed, for example, for automated driving or other safety-critical applications is achieved.

According to a preferred development of the proposed method, each intermediate node can duplicate an Ethernet frame, which contains this data type for safety-relevant data in the communication information, preferably identically several times (i.e. more than once) and send it out in each case in a new separate Ethernet packet. The number of duplicated Ethernet frames can be preferably parameterizable. The number of duplicated Ethernet frames can be predetermined, for example, by different data types for safety-relevant data and/or by parameters contained in the communication information along with the data type for safety-relevant data. This can be done, in particular, by the transmitter of the data when assembling the Ethernet frame. However, it is also conceivable that one or more control devices monitor the quality of service (QoS) of the transmission, particularly a current rate of packet loss, in familiar manner, and transmit it to the Ethernet nodes, i.e. to a control device such as transmitter, receiver and/or intermediate node. By this means, the transmitter but possibly also one of the intermediate nodes or each intermediate node in the transmission path can specify the number of duplicated Ethernet frames on the basis of the transmitted QoS, particularly the transmitted current packet loss rate.

A special advantage, according to the invention, of the present invention lies in that the Ethernet standard is expanded by an Ethernet type or data packet type, respectively, which provides for a special treatment for safety-relevant data. One particular aspect of the invention is that the frame defined in the IEEE standard, i.e. the length and arrangement of the individual data fields, is preferably not changed. Instead, a new identifier is defined in one or more data fields for the data type which indicates safety-relevant data. The definition can be selected in such a manner that they do not collide with identifiers corresponding to the IEEE standard. Since this communication information is evaluated on the transmission path from each Ethernet node, the duplication proposed according to the invention of the data packets can take place, on the one hand. On the other hand, these data are ignored by other Ethernet nodes because they have inadmissible identifiers according to the IEEE standard and are discarded as damaged Ethernet data packets. Thus, the system is compatible and can also be operated in networks which apart from safety-relevant data and control devices allocated to these also process other data and control devices according to the IEEE standard.

Corresponding to a particularly preferred embodiment of the proposed method it is thus provided that data fields present in the Ethernet standard, of the communication information are used for the transmission of the data type for safety-relevant data, in that these are occupied with values, not issued in the Ethernet standard, for the data type for safety-relevant data. Thus, the proposed method is compatible with the IEEE 802.1 Ethernet standard in that network nodes to be involved in the transmission (control devices) are configured to understand, apart from the values defined by the Ethernet standard for the data fields (identifiers) of the communication information, also the data type, defined additionally to the Ethernet standard, for safety-relevant data and process it correspondingly. Network nodes not configured for this discard data packets with values in the communication information which do not correspond to the Ethernet standard used as a basis. Thus, no disturbances occur in a conventional Ethernet network having the usual control devices, either.

Thus, conventional hardware does not need to be altered for implementing the proposed method. Instead, the existing hardware can still be used. The new data type for safety-relevant data can also be integrated into an existing network without existing devices being damaged because they do not notice this data type and thus data packets of this data type. The necessary alteration of the network nodes or control devices, respectively, can be programmed individually by software. Each control device configured correspondingly can then filter packets of this data type and respond in accordance with the proposed method. By using data fields defined in any case in the standard in the communication information of an Ethernet frame, the Ethernet standard is not damaged by implementing this method.

In this connection, it is proposed as particularly preferred embodiment to use the data fields having the destination address, the transmitter address and/or the Ethernet type as data fields of the communication information for the transmission of the data type for safety-relevant data.

The destination address identifies the Ethernet node which is to receive the data as receiver. The transmitter address identifies the network node which has assembled and transmits the data. These addresses are also designated as MAC addresses and contain, apart from an identifier for classification, a MAC address which is unambiguous worldwide. Furthermore, a local administration is allowed which provide for a use of the data type proposed according to the invention for safety-relevant data in spatially limited, local networks such as the Ethernet network in a motor car.

The Ethernet type provides information on the protocol used of the next-higher processing layer according to the OSI layer model within the user data and is used for further processing the data from the received Ethernet packets in a control device. An Ethernet type can be the so-called VLAN type which is used for separating a logical network from its physical structure and provides the opportunity to define different logical subnetworks in a common physical network. According to the IEEE 802.3 MAC tagged standard, the VLAN type can exist as separate data field next to the Ethernet type. This structure of a typical Ethernet packet 51 is shown diagrammatically in FIG. 3, not all data fields being explained more concretely but only data fields essential with regard to the invention. The Ethernet packet 51 has a preamble 57 and an Ethernet frame 58 which is embedded in the Ethernet packet 51 following the preamble 57. The Ethernet frame 58 contains the actual data content which has communication information 59 and data 60. The communication information 59 contains a destination address 61, a transmitter address 62, an Ethernet type 63 and optionally (in the IEEE 802.3 MAC tagged standard) a VLAN tag 64. The data 60 contain the content information 65 and control fields 66 such as, for example, a checksum for checking the content.

The processing of the Ethernet packets takes place in the control devices as part of a stack processing which, according to the OSI layer model consists of seven different layers having different tasks which are processed in sequence in the individual control devices in accordance with the communication protocols.

The lowermost two layers OSI 1 and OSI 2 are then essentially used for the physical communication of the network nodes connected in the network. The lowermost layer OSI 1 is designated as physical layer or bit transmission layer and is used for activating and deactivating physical lines for the transmission. Thus, the hardware control for the transmission path is implemented here. The second layer OSI 2 is designated as data link layer which is used for organizing as faultless a transmission as possible of the individual data packets. Thus, an organization of the communication sequence takes place here. These two layers must be processed by control devices within the context of a communication so that a data link is established at all. Correspondingly, the Ethernet standard IEEE 802.3 which should preferably be used within the context of the invention specifies only the first two layers OSI 1 and OSI 2 of the OSI model.

With the introduction of the switching technology, the Ethernet standard is implemented today as a point-to-point connection and, differently from, for example, the CAN bus or the FlexRay bus, does not represent a bus system. If a number of Ethernet nodes are to communicate with one another as transmitting and receiving units, switching components are therefore necessary which, within the context of the present disclosure, are particularly designated as intermediate nodes and technically can be implemented as so-called switches.

Within the context of the communication, each Ethernet packet 51 receives in its communication information 59 a destination address 61 and a transmitting address 62 which are stored at the beginning of the Ethernet frame. If an intermediate node 67, as it is arranged in FIG. 2 along the transmission path 54 between the control device 52 serving as transmitter and control device 53 serving as receiver, receives an Ethernet frame 58 contained in an Ethernet packet 51, not shown, the intermediate node 67 in the second layer OSI 2 checks the destination address 61, the transmitter address 62, the Ethernet type 63 and, if provided, the VLAN tag 64 and then forwards the Ethernet packet 51 with the Ethernet frame 58 by means of the destination address 61. As shown in FIG. 3, these data fields are located at the beginning of the Ethernet frame 58 and are read in the context of the Ethernet standard in the second layer OSI 2 of the layer model. These form the communication information 59.

The data 60, in contrast, are processed only in layers following the second layer OSI 2 in accordance with the OSI model and correspondingly not considered by the intermediate node 67 as part of the transmission according to the Ethernet standard. An intermediate node (control device 67) configured as switch can thus not access these data 60 in accordance with the Ethernet standard.

Due to the forwarding via one or possibly a number of intermediate nodes 67, the Ethernet packet 51 with the Ethernet frame 58 reaches the receiver 58 which, by means of the communication information 59 in the Ethernet frame 58 recognizes that it is the receiver of the message and subsequently processes it further in the other OSI layers.

The Ethernet frame 58 and the Ethernet packet 51 are correspondingly also assembled in the transmitter 52 in the first and second layer OSI 2 of the OSI model.

Against this background, it is proposed as particularly preferred embodiment according to the invention that the data fields arranged first in the Ethernet frame are used as data fields of the communication information for the transmission of the (data type deviating from the Ethernet standard according to the invention) for safety-relevant data. These are the data fields which are read and evaluated as part of the OSI layer model for communication protocols in the first and second of a total of seven layers in the context of the entire communication organization. The first two layers OSI 1 and OSI 2 are read and evaluated by each Ethernet node participating in the transmission of the Ethernet packet, i.e. both as control devices like transmitter and receiver but also as control devices like intermediate nodes.

According to a preferred embodiment of the proposed method, the intermediate node sends out the Ethernet packet with the duplicated Ethernet frame or the several Ethernet packets with in each case the duplicated Ethernet frame in direct sequence after the Ethernet packet received first with the Ethernet frame generated by the transmitter, i.e., in other words, the original, first Ethernet frame. By this means it is achieved that in the case of damage to one of these Ethernet packets with the original or one of the duplicated Ethernet frames, an Ethernet packet having the same data content (in a duplicated Ethernet frame) reaches the receiver in the quickest possible way. In addition, the receiver in this case can handle the arrival of the several duplicated Ethernet frames in successive Ethernet packets in a particularly simple manner.

Thus, it can be provided according to a preferred embodiment that the receiver of the Ethernet packet checks the correct reception of the Ethernet packet having the Ethernet frame and discards possible subsequently received Ethernet packets having the same Ethernet frame when the Ethernet frame in the communication information has the data type for safety-relevant data. Due to the very close sequence in time of the Ethernet packets with the original Ethernet frame and the duplicated Ethernet frames, such a control can be controlled via the reception in time of the various Ethernet frames since in each case successive Ethernet packets can be taken into consideration especially. A checking of the content, for example via a checksum (possibly also in the higher OSI layers) is also possible so that the further data packets in the higher OSI layers can be discarded when the first data packet has reached the receiver free of faults.

Correspondingly, the invention also relates to a control device having a communication unit for transmitting safety-relevant data in a motor vehicle and having a computing unit, the computing unit being configured to operate the communication unit for receiving and/or transmitting the safety-relevant data by means of an Ethernet packet in accordance with the Ethernet standard in the first and second layer of the OSI layer model, i.e. the physical layer and the data link layer. In accordance with the Ethernet standard, the Ethernet packet has an Ethernet frame with the data content which contains communication information and data. As part of the implementation of the method according to the invention described before, it is necessary in every case that the computing unit of each control device which is intended to participate in a communication according to the method proposed according to the invention is also configured to check after the reception of an Ethernet packet the communication information from the data content of the Ethernet frame for the presence of the proposed data type for safety-relevant data. This applies both for the actual receiver of the data and for a switch operating as intermediate node.

Since control devices, as a rule, provide a bidirectional communication, this is also appropriate for control devices operating as transmitter in order to provide for bidirectional communication. Particularly in the case of a control device acting as intermediate node, the computing unit can also be configured to duplicate an Ethernet frame, which contains the data type for safety-relevant data in the communication information, at least once preferably identically and to send out the duplicated Ethernet frame (or each of the duplicated Ethernet frames) in a new Ethernet packet, i.e. additionally to the received and forwarded Ethernet packet. By this means, the redundancy already described is achieved.

The advantage resulting from the duplication is, on the one hand, that a packet loss of an Ethernet frame is acceptable. Furthermore, the corruption of an Ethernet frame and the discarding can be compensated for by the Ethernet frame coming behind without requiring an explicit new request of such an Ethernet frame. This saves very much time which would otherwise be needed for the new request and sending.

Since in a motor vehicle, each control device, if possible, should be designed in such a way that it can also operate as intermediate node in an actual transmission path, it is appropriate to implement the functionality described before in each of the control devices.

Furthermore, the computing unit can also be configured in the control device, especially if it can operate as receiver of the safety-relevant data, to check the correct reception of an Ethernet packet having the Ethernet frame and to discard possible Ethernet packets subsequently received having the same Ethernet frame (without an ongoing check) when the Ethernet frame in the communication information has the data type for safety-relevant data. This avoids additional work in the evaluation of the Ethernet frames by the receiver.

In the case of a control device operating as transmitter, the computing unit can also be configured to transmit in the communication information of an Ethernet frame of safety-relevant data also a data type for safety-relevant data which is preferably formed by an identifier not defined in the Ethernet standard but may possibly also be accepted as an identifier newly in the Ethernet standard.

Since each control device in the communication network of the motor vehicle according to the Ethernet standard can preferably be used as transmitter, receiver or intermediate node in order to reach as many different physical transmission paths as possible, it is appropriate to implement all of the functions described before in each control device. At least, the computing unit of each control device can be configured at least with the parts of the method described with respect to the control device which are required to carry out the method in the communication with other control devices correspondingly described. It is also possible to configure the computing unit of the control device in such a way that the communication unit of the control device is configured for carrying out all method steps and could thus, in a communication with other control devices, carry out every function, i.e. the function of the transmitter, receiver and/or intermediate node.

The computing unit of the control devices described before can be configured by means of a computer program product.

BRIEF DESCRIPTION OF THE DRAWINGS

Other advantages, features and possible applications of the present invention are also obtained from the subsequent description of an illustrative embodiment and the drawings. In this context, all features described and/or pictorially represented, by themselves or in arbitrary combination, form the subject matter of the present invention also independently of its combination in the claims or their references. In the figures:

DETAILED DESCRIPTION

Figure 1:
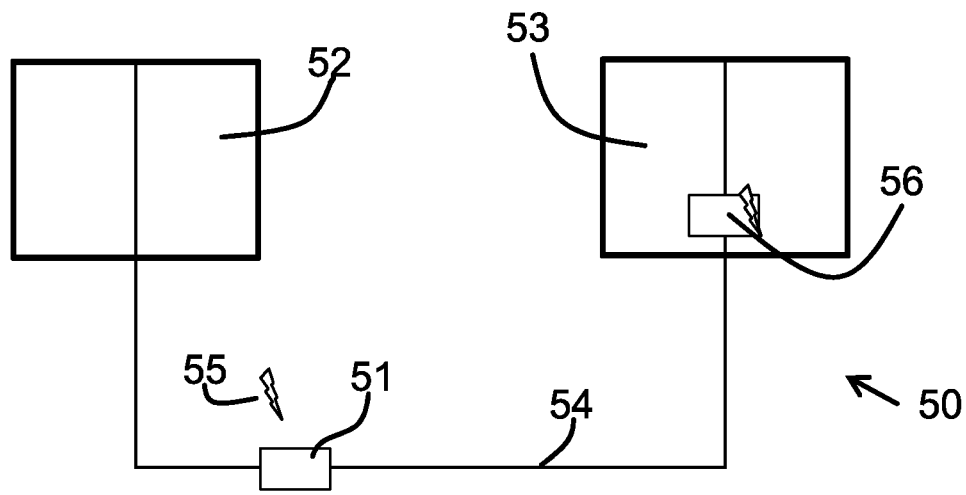
FIG. 1 shows diagrammatically the transmission of an Ethernet packet between a transmitter and a receiver according to the prior art.
Figure 2:
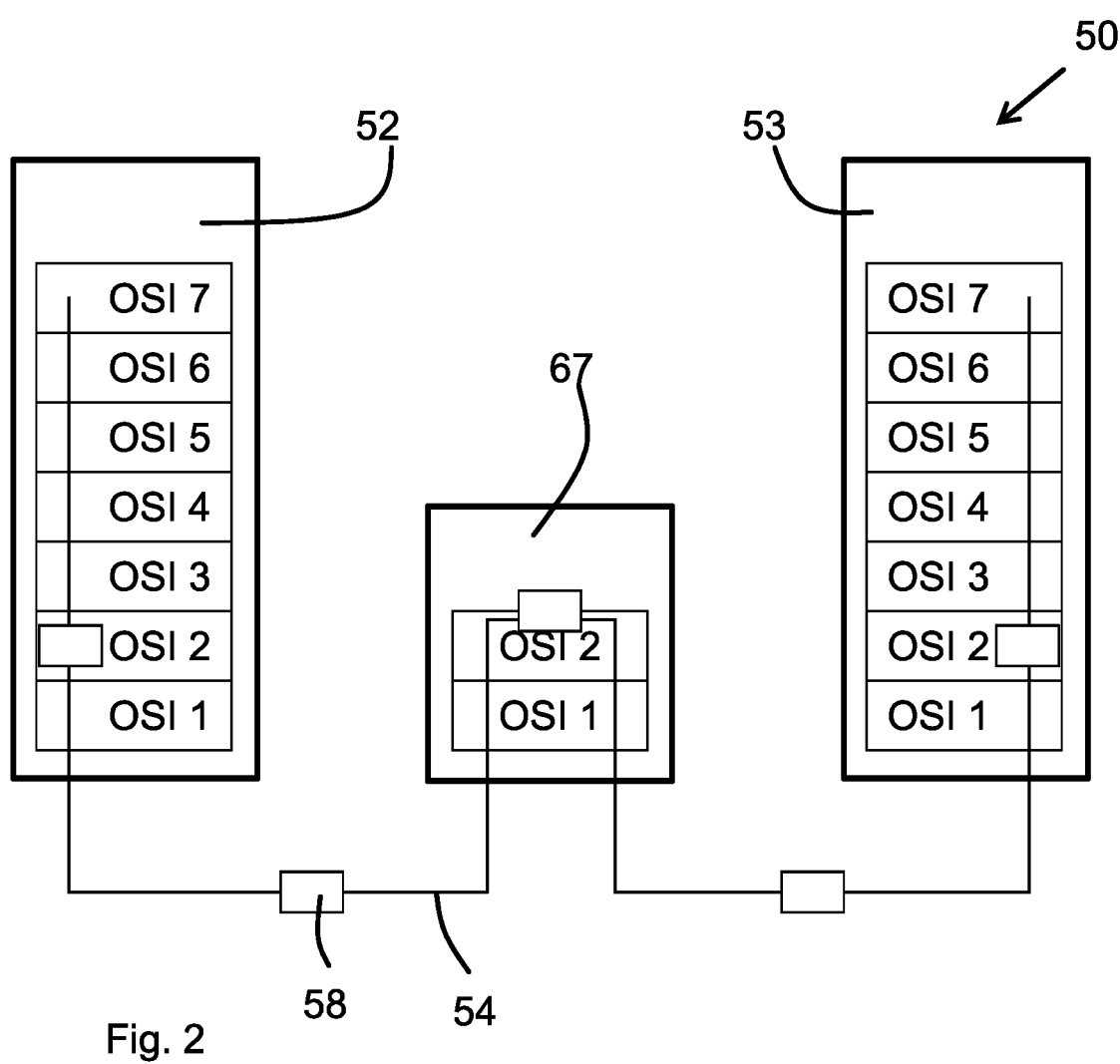
FIG. 2 shows diagrammatically the typical forwarding of an Ethernet frame in the computing units of the control devices within the context of the OSI layer model in accordance with the prior art.
Figure 3:
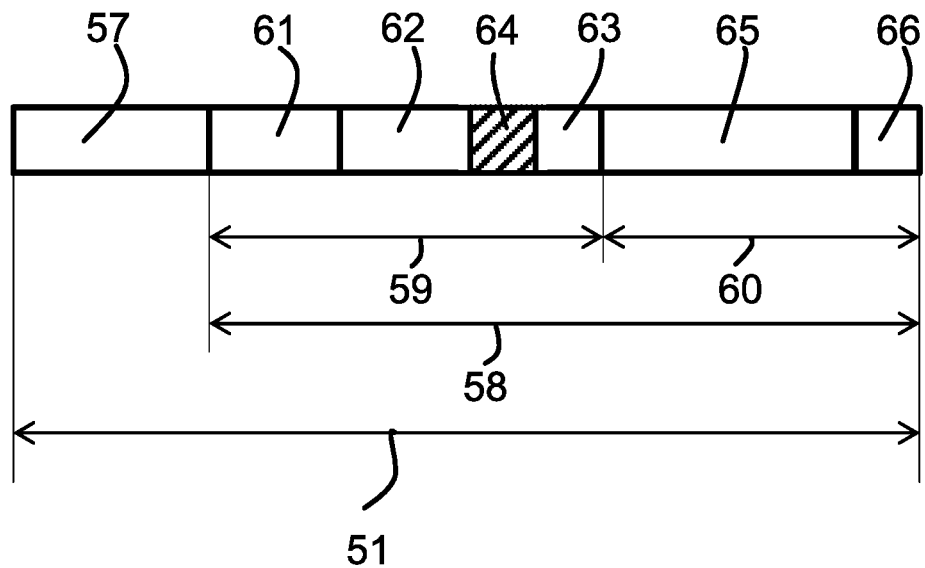
FIG. 3 shows the structure of an Ethernet packet according to the prior art.

In FIGS. 1 to 3, the known Ethernet standard is presented with regard to the structure of the Ethernet packets and the sequence along a communication path, showing the features essential with regard to the present invention. These figures have already been described in detail before for the purpose of explanation. This description is referred to at this point.

Figure 4:
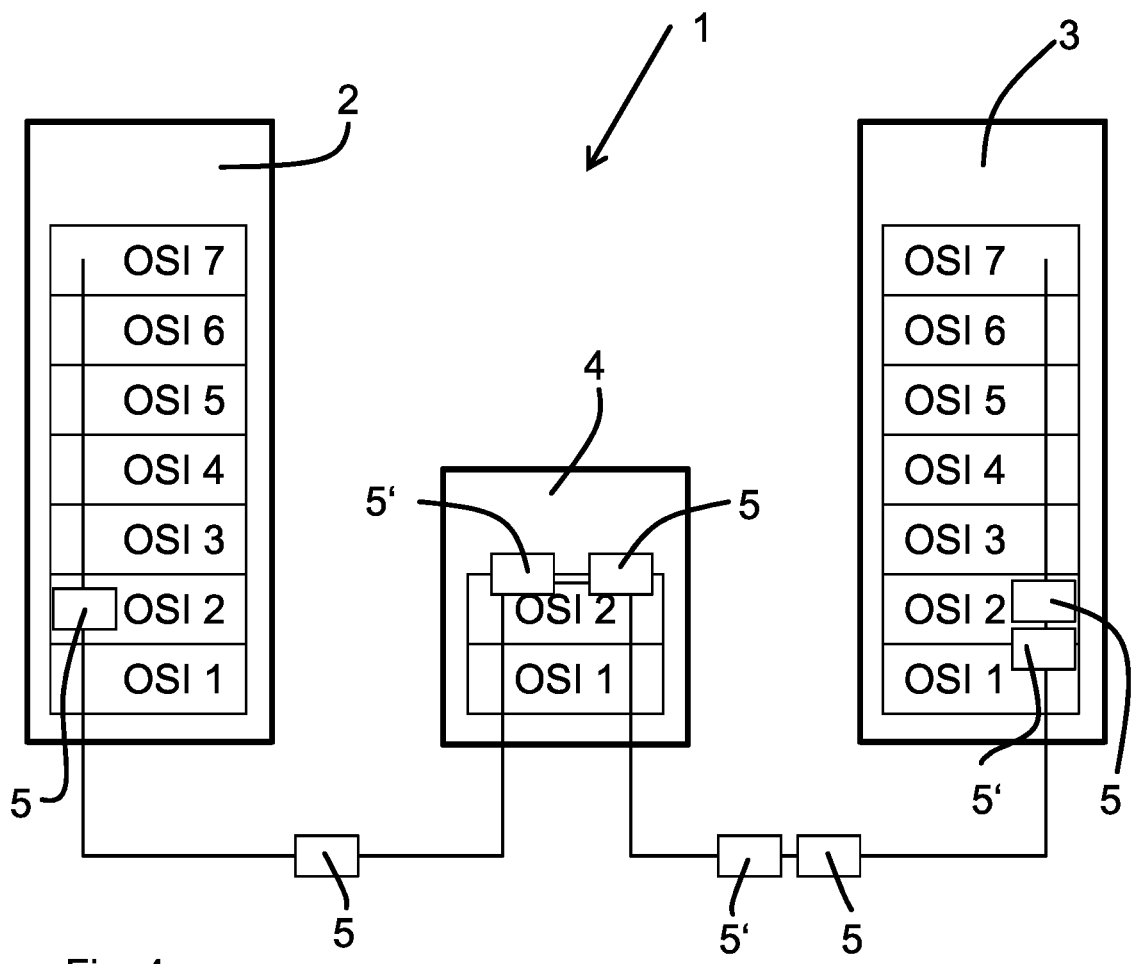
FIG. 4 shows the processing of an Ethernet frame with an identifier, proposed according to the invention, of a data type for safety-relevant data along the transmission path according to a preferred embodiment of the present invention.

FIG. 4 shows a transmission system 1 according to the Ethernet standard which is configured in accordance with the proposed method for transmitting safety-relevant data.

Similar to the presentation according to FIG. 2, the transmission system 1 also has a control device 2 serving as transmitter, a control device 3 serving as receiver and a control device 4 serving as intermediate node. All control devices 2, 3, 4 process the communication protocol according to the OSI model, the Ethernet standard only being implemented in the first two layers OSI 1 and OSI 2 of the layer model. Correspondingly, the transmitter 2 generates in the layer OSI 2 an Ethernet frame 5 which structurally corresponds to the Ethernet frame 58 shown in FIG. 3 and is sent out embedded into an Ethernet packet, not shown.

Figure 5:
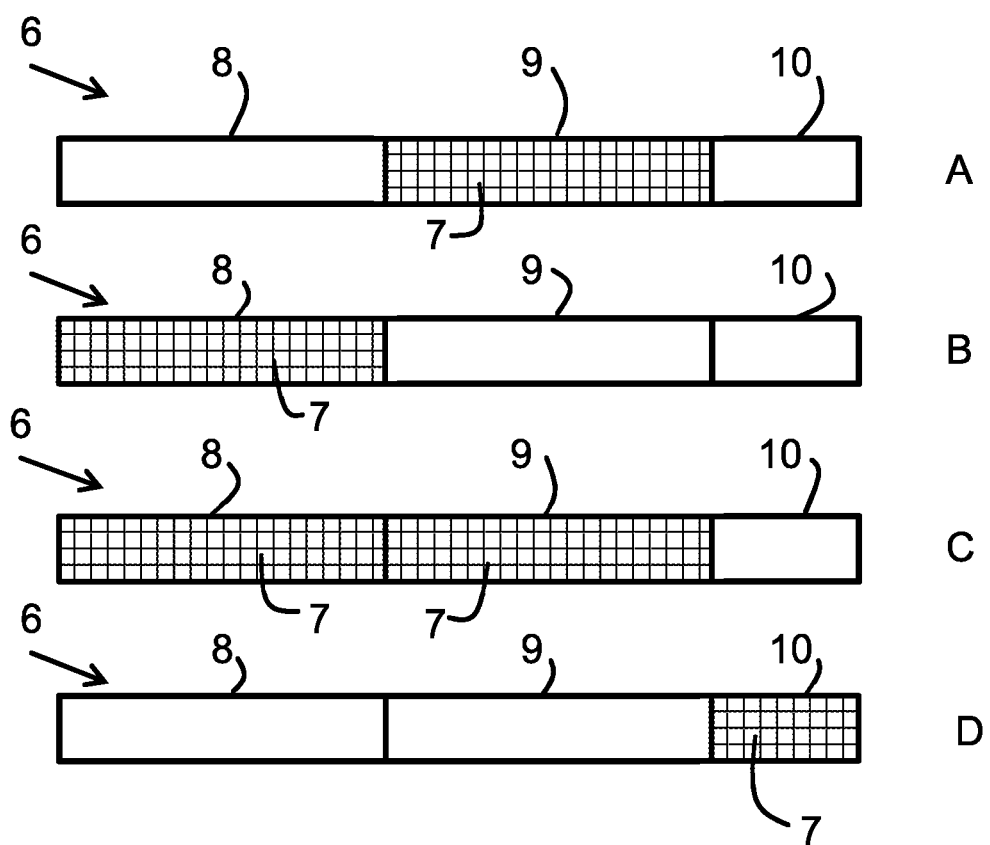
FIG. 5 shows a section of an Ethernet frame with the data type proposed according to the invention in different data fields according to different variants of the present invention.
Figure 6:
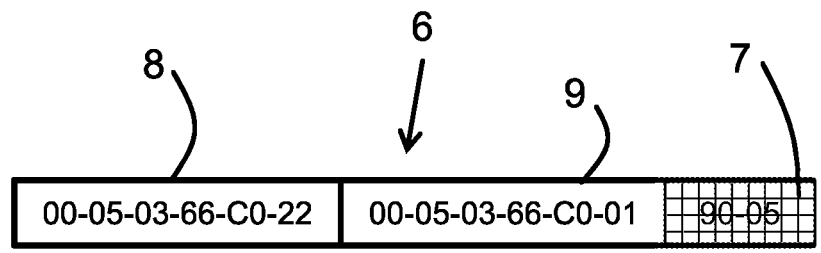
FIG. 6 shows an actual illustrative embodiment for communication data of an Ethernet frame in accordance with the examples described before.

This Ethernet packet with the Ethernet frame 5 contains in the communication information of the Ethernet frame 5, as they are shown diagrammatically in FIGS. 5 and 6, the data type 7 (shown checked in the representation according to FIGS. 5 and 6) which have been installed into the Ethernet frame 5 by the transmitter 2. The intermediate node 4 reads the communication information 6 of the Ethernet frame 5 after the reception and filters it according to data type 7.

If there is such a data type 7 for safety-relevant data in the Ethernet frame 5, the computing unit of the intermediate node 4 duplicates the Ethernet frame to form a duplicated Ethernet frame 5' having identical data content. Both Ethernet frames 5, 5' are designed in preferably immediately successive Ethernet packets, not shown in the representation according to FIG. 4, in the direction of the receiver 6, the duplicated Ethernet frame 5' being sent out preferably after the original Ethernet frame 5. Preferably, no other Ethernet packet should be sent intermediately by the intermediate node between the Ethernet data packet having the Ethernet frame 5 and the Ethernet packet having the duplicated Ethernet frame 5'.

In the representation according to FIG. 4, only one duplicated Ethernet frame 5' is shown. According to the invention, however, there can be a single or a multiple duplication.

Correspondingly, the receiver 3 receives two Ethernet data packets, namely the first Ethernet data packet having the Ethernet frame 5 and the second Ethernet data packet having the duplicated Ethernet frame 5'. The receiver 3 checks if on entry of a data packet into the Ethernet frames 5, 5' the data type 7 for safety-relevant data is present. If this is the case, the receiver 3 can assume that this Ethernet frame 5 will be followed by a copy as duplicated Ethernet frame 5'. If the original Ethernet frame 5 received first has already been received correctly and faultlessly, the receiver 3 discards the subsequent copy of the duplicated Ethernet frame 5'. If, in contrast, an error has occurred in the data packet of the original Ethernet frame 5 during the transmission, the receiver 3 can use the copy, sent subsequently within a very short time interval, of the duplicated Ethernet frame 5'. This creates a high redundancy de facto because no detailed enquiry of the receiver 3 at the transmitter 2 is necessary.

FIG. 5 shows the communication information 6 of an Ethernet frame 5 according to a preferred embodiment. The communication information 6 contains in each case the destination address 8, the transmitter address 9 and the Ethernet type 10. The variants A, B, C and D, shown in FIG. 5, of the communication information 6 differ in that the data type 7 for safety-relevant data is provided as identifier in the different data fields destination address 8, transmitter address 9 and Ethernet type 10, respectively. The variant A shows the data type 7 in the transmitter address 9, the variant B in the destination address 8, the variant C combined in the destination address 8 and the transmitter address 9 and the variant D in the Ethernet type 10.

FIG. 6 shows the variant D from FIG. 5 in an actual numerical example. In this context, certain values of the individual data fields destination address 8, transmitter address 9 and Ethernet type 10 and possibly VLAN tag (not shown in FIGS. 5 and 6) are reserved in accordance with the Ethernet standard. Such reserved destination addresses 8 and transmitter addresses 9 are entered by way of example as so-called MAC addresses in FIG. 6 in the representation.

The Ethernet type 10 has the hexadecimal sequence of numbers 90-05 which is not issued in accordance with the Ethernet standard. The control devices 2, 3, 4 which participate in the transmission system 1 according to the Ethernet standard in the transmission of safety-relevant information can thus filter in the data field of the Ethernet type 10 for the decimal number "09-05" in the example shown in FIG. 6 in order to activate the redundancy function in accordance with the method proposed according to the invention and activate a duplication of the Ethernet frames 5 to form one or more duplicated Ethernet frames 5' which are fed to the receiver 3 as Ethernet packets preferably following one another directly.

The invention claimed is:

1. A method for transmitting safety-relevant data in a motor vehicle by means of an Ethernet standard from a transmitter via at least one intermediate node to a receiver, in which the safety-relevant data are sent from the transmitter in an Ethernet packet, the Ethernet packet having an Ethernet frame with a data-content portion, the data-content portion containing a communication-information portion and a data portion, each intermediate node, which receives the Ethernet packet evaluates at least a part of the communication-information portion from the data-content portion which is used in a first or second layer of the OSI layer model in a context of a communication organization and forwards the Ethernet packet in accordance with the evaluated communication-information portion, and the receiver receives the Ethernet packet, evaluates the communication-information portion from the data-content portion and evaluates the data portion from the data-content portion when, on the basis of the evaluated communication-information portion, it is the receiver of the safety-relevant data, characterized in that in the communication-information portion, used in the first or second layer of the OSI layer model, of the Ethernet frame a data type for safety-relevant data is transmitted with the safety-relevant data, each intermediate node checks in the received Ethernet packet the communication-information portion used in the first or second layer of the OSI layer model from the data-content portion of the Ethernet frame for a presence of an identifier for the data type for safety-relevant data, each intermediate node duplicates, at least once, an Ethernet frame based on the Ethernet frame containing the identifier for the data type for safety-relevant data in at least one of a destination-address field, a transmitter-address field, an Ethernet-type field, and a VLAN-tag field of the communication-information portion of the Ethernet frame used in the first or second layer of the Open Systems Interconnection ("OSI") layer model, and each intermediate node sends out the duplicated Ethernet frame in a new Ethernet packet;

wherein at least one of the destination-address field, the transmitter-address field, the Ethernet-type field, and the VLAN-tag field, present in the Ethernet standard, of the communication-information portion used in the first or second layer of the OSI layer model are used for the transmission of the identifier for the data type for safety-relevant data, in that at least one of these Ethernet-standard communication-information fields is occupied with a specific value, which is selected from a group of inadmissible identifiers that are reserved in accordance with the Ethernet standard, for the identifier for the data type for safety-relevant data such that only intermediate nodes that are configured to be able to interpret the inadmissible, reserved values as the identifier for the data type for safety-relevant data will interpret the specific value as the identifier for the data type for safety-relevant data, while intermediate nodes that are not configured to be able to interpret the inadmissible, reserved values as the identifier for the data type for safety-relevant data will discard, as damaged, Ethernet frames containing the specific value; and wherein the destination-address field, the transmitter-address field, and the Ethernet-type field are utilized as data fields of the communication-information portion used in the first or second layer of the OSI layer model for the transmission of the identifier for the data type for safety-relevant data.

2. The method as claimed in claim 1, characterized in that each intermediate node duplicates an Ethernet frame, which contains the identifier for the data type for safety-relevant data in the communication-information portion, several times and sends it out in each case in a new separate Ethernet packet, the number of duplicated Ethernet frames being parameterizable.

3. The method as claimed in claim 1, characterized in that the data fields arranged first in the Ethernet frame are used as data fields of the communication-information portion used in the first or second layer of the OSI layer model for the transmission of the data type for safety-relevant data.

4. The method as claimed in claim 3, characterized in that the intermediate node sends out the Ethernet packet with the duplicated Ethernet frame or the several Ethernet packets with in each case the duplicated Ethernet frame in direct sequence after the Ethernet packet received first with the Ethernet frame generated by the transmitter.

5. The method as claimed in claim 4, characterized in that the receiver of the Ethernet packet checks the correct reception of the Ethernet packet having the Ethernet frame and, in the case of a correct reception, discards possible subsequently received Ethernet packets having the same Ethernet frame when the Ethernet frame in the communication-information portion used in the first or second layer of the OSI layer model has the identifier for the data type for safety-relevant data.

6. A control device having a communication unit for transmitting safety-relevant data in a motor vehicle and having a computing unit, the computing unit being configured to operate the communication unit for receiving and/or transmitting the safety-relevant data by means of an Ethernet packet in accordance with an Ethernet standard in a first and second layer of an Open Systems Interconnection ("OSI") layer model, the Ethernet packet having an Ethernet frame with a data-content portion which contains a communication-information portion and a data portion, characterized in that the computing unit is configured to evaluate after the reception of the Ethernet packet at least a part of the communication-information portion from the data-content portion of the Ethernet frame which is used in the first and second layer of the OSI layer model as part of the communication organization and to check it for a presence of an identifier for a data type for safety-relevant data;

wherein at least one of a destination-address field, a transmitter-address field, an Ethernet-type field, and a VLAN-tag field, present in the Ethernet standard, of the communication-information portion of the Ethernet frame used in the first or second layer of the OSI layer model are used for the transmission of the identifier for the data type for safety-relevant data, in that these Ethernet-standard communication-information fields are occupied with a specific value, which is selected from a group of inadmissible identifiers that are reserved in accordance with the Ethernet standard, for the identifier for the data type for safety-relevant data such that only intermediate nodes that are configured to be able to interpret the inadmissible, reserved values as the identifier for the data type for safety-relevant data will interpret the specific value as the identifier for the data type for safety-relevant data, while intermediate nodes that are not configured to be able to interpret the inadmissible, reserved values as the identifier for the data type for safety-relevant data will discard, as damaged, Ethernet frames containing the specific value; and wherein the destination-address field, the transmitter-address field, and the Ethernet-type field are utilized as data fields of the communication-information portion used in the first or second layer of the OSI layer model for the transmission of the identifier for the data type for safety-relevant data.

7. The control device as claimed in claim 6, characterized in that the computing unit is configured to duplicate an Ethernet frame, which contains the identifier for the data type for safety-relevant data in the communication-information portion used in the first or second layer of the OSI layer model, at least once and to send out the duplicated Ethernet frame in a new Ethernet packet.

8. The control device as claimed in claim 7, characterized in that the computing unit is configured to check the correct reception of an Ethernet packet having the Ethernet frame and, in the case of a correct reception, to discard possible subsequently received Ethernet packets having the same Ethernet frame when the Ethernet frame in the communication-information portion used in the first or second layer of the OSI layer model has the identifier for the data type for safety-relevant data.

9. The control device as claimed in claim 8, characterized in that the computing unit is configured to transmit in the communication-information portion used in the first or second layer of the OSI layer model of an Ethernet frame of safety-relevant data also a data type for safety-relevant data.

10. A non-transitory computer-readable medium storing a program for configuring, when executed on a computing unit of a control device having a communication unit for transmitting safety-relevant data in a motor vehicle, the computing unit being configured to operate the communication unit for receiving and/or transmitting the safety-relevant data by means of an Ethernet packet in accordance with an Ethernet standard in a first and second layer of an Open Systems Interconnection ("OSI") layer model, the Ethernet packet having an Ethernet frame with a data-content portion which contains a communication-information portion and a data portion, characterized in that the computing unit is configured to evaluate after the reception of the Ethernet packet at least a part of the communication-information from the data-content portion of the Ethernet frame which is used in the first and second layer of the OSI layer model as part of the communication organization and to check it for the presence of a data type for safety-relevant data;

the computing unit being configured to duplicate, at least once, the Ethernet frame based on the Ethernet frame containing the identifier for the data type for safety-relevant data in at least one of a destination-address field, a transmitter-address field, an Ethernet-type field, and a VLAN-tag field of the communication-information portion of the Ethernet frame used in the first or second layer of the OSI layer model, and to send out a duplicated Ethernet frame in a new Ethernet packet;

the computing unit being configured to check the correct reception of an Ethernet packet having the Ethernet frame and, in the case of a correct reception, to discard possible subsequently received Ethernet packets having the same Ethernet frame when the Ethernet frame in the communication-information portion used in the first or second layer of the OSI layer model has the identifier for the data type for safety-relevant data;

the computing unit being configured to transmit in the communication-information portion used in the first or second layer of the OSI layer model of the Ethernet frame of safety-relevant data also the identifier for the data type for safety-relevant data;

wherein at least one of the destination-address field, the transmitter-address field, the Ethernet-type field, and the VLAN-tag field, present in the Ethernet standard, of the communication-information portion used in the first or second layer of the OSI layer model are used for the transmission of the identifier for the data type for safety-relevant data, in that these Ethernet-standard communication-information fields are occupied with a specific value, which is selected from a group of inadmissible identifiers that are reserved in accordance with the Ethernet standard, for the identifier for the data type for safety-relevant data such that only intermediate nodes that are configured to be able to interpret the inadmissible, reserved values as the identifier for the data type for safety-relevant data will interpret the specific value as the identifier for the data type for safety-relevant data, while intermediate nodes that are not configured to be able to interpret the inadmissible, reserved values as the identifier for the data type for safety-relevant data will discard, as damaged, Ethernet frames containing the specific value; and wherein the destination-address field, the transmitter-address field, and the Ethernet type are utilized as data fields of the communication-information portion used in the first or second layer of the OSI layer model for the transmission of the identifier for the data type for safety-relevant data.

\* \* \* \* \*